United States Patent [19]

Mercado

[11] Patent Number: 5,108,135
[45] Date of Patent: Apr. 28, 1992

[54] FIBER REINFORCED PLASTIC PIPE TEE

[75] Inventor: Hector P. Mercado, Wichita Falls, Tex.

[73] Assignee: Ameron, Inc., Monterey Park, Calif.

[21] Appl. No.: 584,512

[22] Filed: Sep. 18, 1990

[51] Int. Cl.[5] .............................................. F16L 41/00
[52] U.S. Cl. .................................. 285/156; 285/423; 156/173
[58] Field of Search ..................... 285/156, 423, 919; 156/173, 175, 425

[56] References Cited

U.S. PATENT DOCUMENTS

| | | | |
|---|---|---|---|
| 2,751,237 | 6/1956 | Conley | 285/423 X |
| 2,878,038 | 3/1959 | Noland | 285/423 X |
| 3,577,294 | 5/1971 | David | 156/173 |
| 3,578,532 | 5/1971 | Thaden . | |
| 3,765,979 | 10/1973 | Thomas | 285/423 X |
| 4,106,797 | 8/1978 | Michael | 285/423 X |
| 4,504,086 | 3/1985 | Corrow | 285/423 X |
| 4,506,918 | 3/1985 | Friedrich et al. . | |
| 4,601,496 | 7/1986 | Ulrich et al. . | |
| 4,601,770 | 7/1986 | Ulrich et al. . | |
| 4,854,990 | 8/1989 | David . | |

Primary Examiner—Dave W. Arola
Attorney, Agent, or Firm—Christie, Parker & Hale

[57] ABSTRACT

A fiber reinforced plastic pipe tee has a body with a principal structural layer of reinforcing fibers bonded by resin, preferably comprising interleaved layers of continuous fibers and a tape of short parallel fibers having ends embedded in the structural layer and lying approximately orthogonal to the continuous fibers. In triangular areas on each side of the tee where the run and branch meet, there is a row of long slender spikes embedded in the principal structural layer. The spikes extend normal to the mid-plane of the tee, and the tee is wound so that at least a portion of the fibers passing through the spaces between the spikes change direction in those spaces. Using the spikes for hooking the continuous fibers and tapes of short fibers enables coverage of the triangular area with adequate reinforcement without building up excess material in other portions of the tee.

27 Claims, 5 Drawing Sheets

FIBER REINFORCED PLASTIC PIPE TEE

FIELD OF THE INVENTION

This invention relates to a fiber reinforced plastic pipe tee such as, for example, a glass fiber reinforced epoxy resin tee. Means are provided for assuring adequate reinforcing fibers in a triangular diaphragm area between the branch and run on each side of the tee.

BACKGROUND OF THE INVENTION

Fiber reinforced plastic pipe has come into reasonably extensive use in recent years for handling corrosive materials, petrochemicals and the like, where metallic pipe is unsuitable. Glass fiber reinforcements are employed so that pipe can withstand appreciable pressures. Epoxy resins, commonly with a thin liner resistant to chemicals, are often used. The liner may be an unreinforced epoxy resin somewhat flexibilized for a good sealing. The pipes are formed by winding rovings of glass fiber coated with epoxy resin in helical paths around a cylindrical mandrel and curing the resin. Such pipes can be made economically and it is also desirable to make economical high pressure fittings for such pipes, such as tees and elbows.

Techniques have been developed for economically winding pipe elbows which are essentially sharply curved sections of pipe having two ends. Economical techniques are desirable for winding pipe tees since they have a much more complicated geometry Unlike an elbow with two ends, a pipe tee has three ends. This greatly complicates the winding problems since it is important to cover all areas of the tee with a sufficient thickness of fibers with proper orientation for resisting the complex stress distributions in a tee without excess thickness being built up in other areas.

The patterns used for winding the tee must keep fibers in contact with or very close to the underlying mandrel liner or fibers to prevent voids or "bridging" of fibers across concave regions. Such voids or bridging can result in low strength in the bridged areas and require excessive quantities of reinforcement for resisting operating pressures.

Service requirements for fiber reinforced plastic pipe have increased over the years and it is desirable to have pipe and fittings with pressure ratings of as much as 2,000 psi (140 kg/cm$^2$). To provide factors of safety, fittings are designed with short-term burst strength of 4,000 psi (280 kg/cm$^2$) or more. Such requirements force substantial wall thicknesses for fittings, and winding of excess materials in areas where it is not needed may significantly increase the cost of such a fitting.

Many commercially available tees are made by hand by laying up a montage of strips of woven fabric. Such assembly techniques are costly since the woven glass fabric is expensive and a large amount of hand labor is required. Quality control of such assembly procedures is also difficult and costly. It is preferable to employ relatively inexpensive glass rovings (bundles of individual fibers) and short glass fibers properly oriented for optimum strength rather than costly woven fabric. Such a technique must cover all areas of the tee with an adequate thickness of material with proper orientation to resist the complex stress distribution in a pipe tee without excessive waste or thickness in some less critical areas of the tee.

One area of particular concern because of adverse stress distributions is known as the triangle, diamond or diaphragm area. It comprises a roughly triangular area on each side of the tee near where the three arms of the tee intersect. This area tends to be relatively flat and subject to biaxial stresses which are large and hard to resist in a non-ductile material such as fiber reinforced plastic.

Techniques for winding pipe tees are described in U.S. Pat. Nos. 4,506,918, 4,601,496, and 2,601,770. Techniques provided therein include winding of rovings of glass fibers in a variety of patterns that assure total 1 coverage of the triangular diaphragm as well as other portions of the tee body. U.S. Pat. No. 4,601,496 describes use of a special tape having several synthetic warp strands, such as nylon, serving as a carrier web for short parallel bundles of straight glass fibers as a weft. The carrier fibers have very little strength as compared with the glass and hence are not reinforcing fibers in the completed tee.

A typical tape suitable for winding a pipe tee has about a dozen warp strands of nylon spaced apart across the width of the tape for supporting the weft. The weft is formed of bundles of parallel glass fibers about five to six centimeters long. The bundles are made of short glass fibers ending at the end of the bundle, as distinguished from a woven fabric in which the weft strands are continuous fibers repeatedly doubled back on themselves at a selvage. The tape is also distinguished from fabric in that its strength is unidirectional along the length of the weft fibers, whereas woven fabric has biaxial strength. The warp strands of the tape are knitted into a series of interlocking loops with each loop loosely holding a bundle of glass fibers. A typical unidirectional tape has sufficient glass fibers to weigh about 430 grams per meter.

Such a tape is particularly useful for forming a pipe tee since the loosely knitted synthetic warp strands can stretch and slip laterally for covering the tape without bunching or deforming the bundles of glass fibers. The loose looping also permits skewing, that is, when the tape is wound on a mandrel the bundles of glass fibers need not remain perpendicular to the warp strands, although the bundles of glass fibers remain essentially parallel to each other. This is significant so that the tape can lie against the curved surfaces of the tee and the bundles of glass fibers can be maintained in alignments that are parallel to the principal direction of stress, thereby forming a strong pipe tee with a minimal use of material.

Typically such a tape is interleaved with a band of rovings of continuous glass fibers. A band of fibers about five to six centimeters wide impregnated with epoxy resin is wound onto the tee along with a layer of such tape. The tape can be dry, with resin supplied in the finished product by the impregnated band of glass rovings, or may also be coated with epoxy resin.

The tees wound in accordance with the aforementioned patents were formed on a mandrel with "lugs" at each end of the run and branch so that the windings of rovings and tape went off the end of the tee and were wrapped around the lug for achieving a desired angle of winding across the tee. When one winds a pipe tee for 2,000 psi (280 kg/cm$^2$) service, wall thicknesses become quite high. For example, a nominal six inch (15 cm.) pipe tee may have a wall thickness of six to seven centimeters and winding excess material on the lugs can be difficult because of the large thickness, and furthermore the trimming of all of the excess material from the ends of the tee may be prohibitedly costly. It is therefore preferable to have the tee wound on a mandrel where the windings do not extend appreciably beyond the ends of the tee and little, if any, trimming is required for minimizing waste of material.

Suitable windings can easily be made in major portions of the tee such as, for example, at the ends of the run and branch where circumferential windings of the rovings and tape provide appropriate strength. As usual, difficulties are encountered in providing adequate strength and appropriate directions in the triangle area or diaphragm where the run and branch meet.

In practice of this invention, a row of spikes is placed in the diaphragm area and the rovings and tape are wound through the row so as to change direction in the spaces between spikes, thereby assuring appropriate orientation of reinforcing fibers in this region without excessive buildup of material in other areas.

Figure 1:
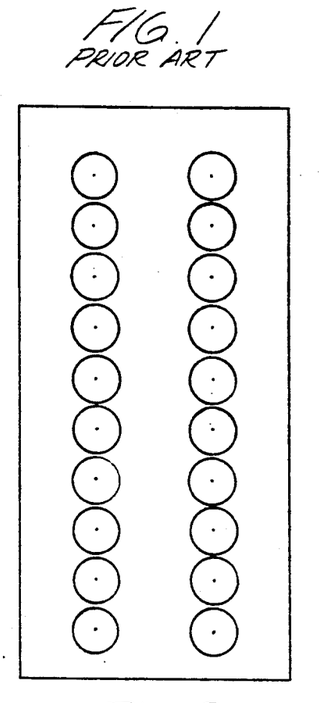
FIGS. 1 and 2 illustrate in plan and side views, respectively, prior spikes applied over the structural layer of a pipe tee.
Figure 2:
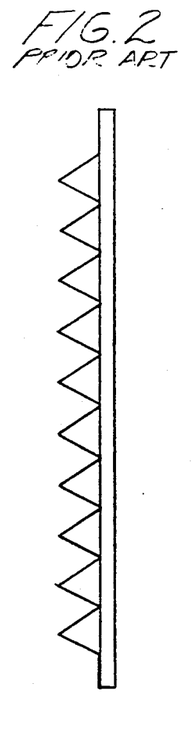

A type of "spikes" which are probably better characterized as "bumps" have been previously employed in the triangle area of a fiber reinforced plastic pipe tee. These bumps, which are illustrated in FIGS. 1 and 2, were short cones with a base diameter of 8 mm and a height of 7.6 mm. The cones were spaced apart 9.5 mm in each of two rows which were about 22.2 mm apart center to center. The cones were integral with a 5 cm wide flat base about 1.5 to 2 mm thick.

Such a tee was made by forming a principal structural layer comprising patches of fabric and windings of bidirectional woven roving. Pieces of fabric were cut to appropriate shapes for covering various areas on the tee, wetted with resin, and laid in place by hand. Next layers of woven roving three or four inches wide and wetted with resin were spirally wrapped around the mandrel to form the principal structural layer of the tee. This was "tied down" with a nylon veil.

After the windings and patches were in place to form the structural body of the tee, a pad with two rows of "spikes", as described above and illustrated in FIGS. 1 and 2, was placed in each of the triangle areas on opposite sides of the tee. The two rows of "spikes" on the pads extended parallel to the run axis. The pads were tied down with windings of glass roving under substantial tension.

Windings of rovings alone were then made around the structural layer with some windings being made from around the back of the run to the row of "spikes" where the direction of winding was reversed and the rovings returned around the back of the run. A generally V-shaped pattern of windings was made, extending as far toward the branch as possible. This was followed with windings of rovings alone in patterns similar to those used to build up the structural layer of the tee.

The purpose of the overwrap of rovings onto the pipe tee was primarily cosmetic. The patches and woven rovings in the underlying structural body of the tee appear irregular, porous and undesirable to customers. The overwinding of rovings hides the tape and fabric, making a more attractive and saleable product. Such winding of rovings does contribute to the strength of the tee, but the principal structural strength was provided by the body of interleaved tape and rovings and the fabric patches underlying the bumps.

Such tees were made in sizes ranging from 6 to 16 inches nominal (15 to 40 cm) with a pressure rating of 150 psi (10.5 kg/cm$^2$). These strips with two row of bumps ranged from 11.4 cm long with 11 bumps in each row for a 6 inch nominal pipe tee to a strip 18 cm long with 29 bumps in each row for a 16 inch nominal tee. Such an arrangement is totally unsuitable for high pressure tees as provided in practice of this invention.

For purposes of description in this specification, it is convenient to adopt a nomenclature representing various portions of a pipe tee. The following glossary of terms is therefore adopted:
  run: the straight portion of the tee through which fluid can flow in a straight path;
  branch: the cross member of the tee transverse to the run through which fluid can flow in a right angle path between the branch and run;
  tee diameter: the nominal diameter of the pipe with which the tee is used. It is also the nominal diameter of the run and branch
  mid-plane: the plane of symmetry through the tee including the axes of the run and branch;
  side: a portion of the tee on one side of the mid-plane;
  back: a portion extending along the run of the tee on the opposite side of the run from the branch;
  front: a portion of the run facing in the same direction as the branch;
  crotch: each of the two portions where direction changes between the branch and an end of the run of the tee;
  diaphragm: a generally triangular area on each side of the body of the tee adjacent the intersection of the run and branch and more or less parallel to the mid-plane. This may also be referred to as the triangle or diamond.

BRIEF SUMMARY OF THE INVENTION

A fiber reinforced plastic pipe tee having a straight run and a side branch comprises an inner layer of resin, such as epoxy, reinforced with fibers, such as glass fibers. Overlying this there is a row of resin spikes extending along a side of the branch normal to the axis of the run, with each spike extending approximately normal to the mid-plane of the tee. A principal structural layer of resin and reinforcing fibers overlies this inner layer, with at least a portion of the fibers extending through the spaces between the spikes and changing direction in the spaces between the spikes.

Preferably, the principal structural layer comprises alternating layers containing continuous reinforcing fibers and layers containing short fibers having their ends embedded in the structural layer. The short fibers may be applied by winding a tape having a weft of parallel reinforcing fibers and a warp of carrier fibers. The spikes are configured to easily pierce the tape so that the reinforcing fibers may be pulled tight against the underlying layers without appreciable voids.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 4:
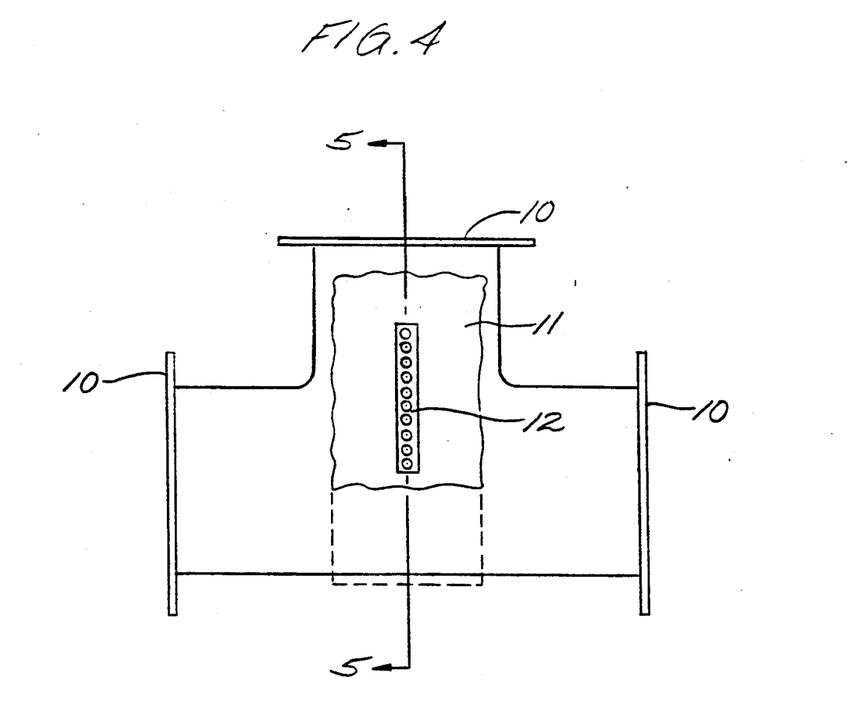
FIG. 4 is a side view of a pipe tee with a row of spikes in place.
Figure 5:
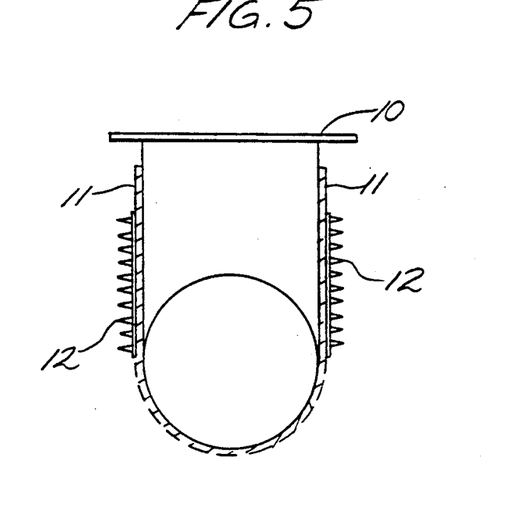
FIG. 5 is an end view of the tee illustrated in FIG. 4.

A pipe tee is wound on a conventional steel mandrel having a shape corresponding to the inside of the tee as illustrated in FIGS. 4 and 5. End flanges 10 are secured at the ends of the run and branch of the mandrel and serve as a limit or "stop" at the ends of the windings. The windings do not extend beyond the end flanges. Such a mandrel is made in the form of a few pieces bolted securely together so that after the tee is completed the mandrel can be disassembled and removed from the interior of the tee. Conventional wax and mold release agents are applied to the mandrel to ease its removal from the finished part.

Typically, the inside of the tee has an epoxy rich liner layer for providing a good resistance to materials carried by the pipe system, a good seal to connecting pipes and a pressure seal to resist leakage through overlying reinforcing fiber windings in the event there is porosity in the windings. This inner lining may be reinforced with synthetic fiber and is typically made with a flexibilized epoxy resin to be somewhat more flexible than the resin used in the surrounding reinforcing fibers.

Thus, the first step in winding a pipe tee is typically to form a lining about 1.5 to 2.5 mm thick. The mandrel is coated with epoxy resin and pieces of C-veil and polyester reinforcing veil are laid up on the mandrel and coated with resin to build up the desired thickness. If desired the liner may be partially cured before proceeding or the overlying structural layers may be added over uncured resin. This is conventional practice in making pipe tees.

A pair of patches 11 are then applied to each side of the tee covering a substantial portion of the branch and extending across most or all of the diaphragm or triangle area on the side of the tee where the run and branch meet. On smaller size tees (e.g., for nominal four inch pipe) a single patch extending from one side of the branch around the back of the run to the other side of the branch may be used as indicated by the dashed line in FIGS. 4 and 5. The patches made of as many layers of bidirectional woven fiberglass fabric as may be required to build up the desired thickness. Typical thickness is about 6 to 7 mm, and thin fabric is used so that as many as 16 layers of biaxial material may be used to make up this thickness. The woven patch provides some extra thickness and bidirectional reinforcement in the diaphragm area. The fabric is impregnated with epoxy resin and when the patches are in place excess resin is squeezed out by hand.

For example, on a nominal four inch (10 cm) pipe tee a 15 centimeter wide patch almost a ½ meter long is wrapped around the back of the run and up both sides of the branch. On a six inch (15 cm) nominal tee a pair of patches 20 centimeters wide (in the direction around the branch) and about 25 centimeters long are applied on opposite sides of the tee.

Figure 3:
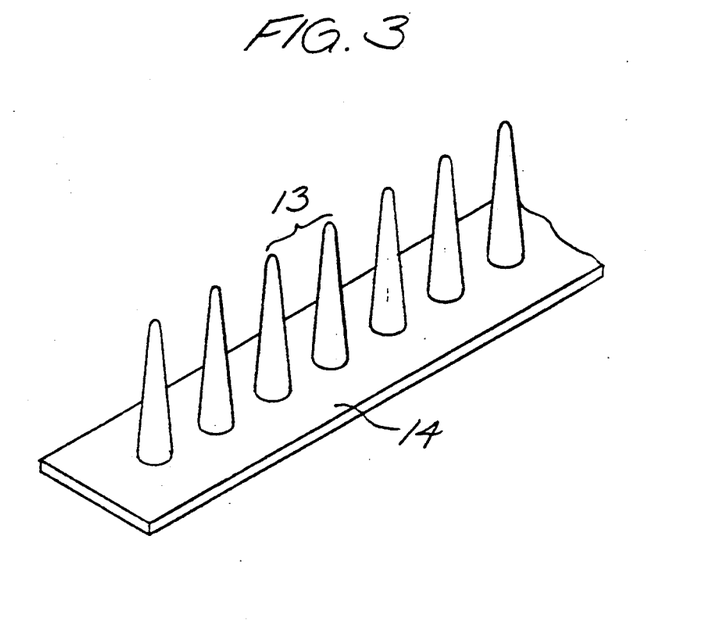
FIG. 3 is an isometric view of an end of a strip of spikes employed in practice of this invention.

After the patches are in place, a row 12 of spikes is positioned on each side of the tee extending along the length of the branch and across the diaphragm. The end of an exemplary row of spikes is illustrated in FIG. 3. The spikes 13 are spaced apart and integral with a ribbon 14. The spikes and ribbon are typically made of the same flexibilized resin employed for the liner and are precast in long strips and cured before use. Strips are cut to the appropriate length for a given pipe tee size.

In an exemplary embodiment, the ribbon is about 22 mm wide and 1.5 to 2.5 mm thick. The resin used for the ribbon and spikes is preferably sufficiently flexible that the ribbon may be bent to form a circle as small as 10 centimeters diameter. Such flexibility is desirable so that spikes are not inadvertently broken during fabrication and so that the ribbon can deform somewhat to conform to the underlying patch, which is typically not flat.

The individual spikes are spaced apart about 12 to 13 mm. Each spike is 23 to 24 mm high and has a circular base adjacent to the ribbon about 6 mm in diameter. Each spike tapers to a diameter of about 3 mm at the tip. By having each spike with a length several times its average diameter, it is capable of piercing tape used for winding the principal structural layer 15 of the tee and can provide a place to "hook" fibers for turning throughout a thick structural layer.

A preferred flexibilized epoxy resin used for the liner of the tee and ribbon having a row of spikes has a glass transition temperature of about 114° C. The epoxy resin used for the principal structural layer of the pipe tee has a glass transition temperature of about 140° C. Generally speaking, the higher the glass transition temperature, the less ductile or more brittle the resin. The resin used for the spikes needs to be stiff enough so that the spikes do not bend appreciably when pulled laterally by reinforcing fibers hooked on the spikes, yet the ribbon needs to be flexible enough to more or less conform to the underlying surface for minimizing voids. Some flexibility is also desirable in the spikes so that they may bend somewhat without breaking.

In a nominal four inch pipe tee, a row of 8 spikes is placed on each side of the tee with the first spike in the row being about 8 centimeters from the end flange 10. Where six inch nominal pipe tee there may be 10 spikes in the row and the first spike is about 12 centimeters from the flange at the end of the branch.

Figure 6:
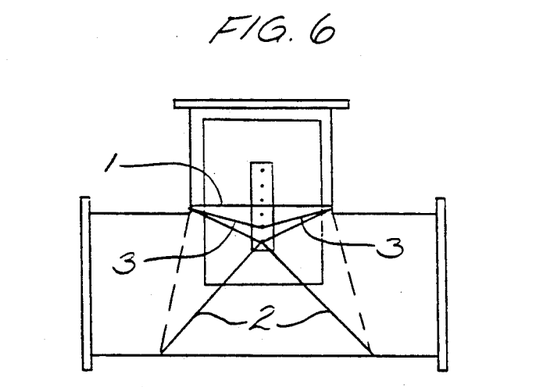
FIGS. 6 and 7 are side views of a pipe tee illustrating a sequence of fiber strands for holding the row of spikes in place.
Figure 7:
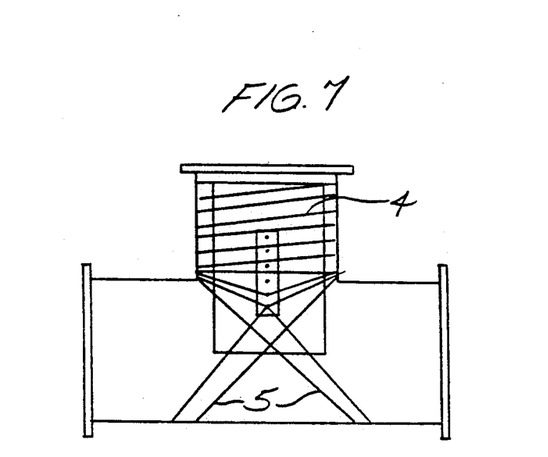

The row of spikes is then tied to the mandrel over the underlying patch or patches by first winding several circumferential wraps 1 of dry fiberglass roving around the branch near the crotches and over the ribbon formed integral with the spikes. The roving readily passes between the tall slender spikes. Next, two diagonal windings 2 are made between one crotch and the back of the run through the space between the last two spikes in the diaphragm area so as to hook around the last spike and change direction at that spike. These diagonals hooked on the last spike keep the row of spikes from sliding toward the end of the branch.

More nearly circumferential diagonal passes 3 are then made around the branch through the two crotches and hooking onto the second spike in the row, tending to pull the strip of spikes toward the end of the branch. These two hoop passes 3 are wound with somewhat higher tension and counteract the diagonal windings 2 which go around the back of the run for securing the strips against longitudinal motion in either direction along the branch. Finally, a helix having a pitch of a centimeter or so is wound circumferentially along the length of the branch to finish securing the ribbons and spikes in place.

In an embodiment where two patches are used instead of a single patch wrapped around the back of the run, additional diagonal windings 5 are made from each crotch around the back of the run to help tie the patches down. Additional wrappings may be made as would appear necessary to hold everything in place while the overlying structural layer is commenced.

Typically, such windings are applied in a conventional winding machine which holds the mandrel and permits rotation about either the run axis or branch axis. By combining such rotations and delivering fiber to the mandrel from a delivery ring which can move in a programmed pattern adjacent to the mandrel, one can place windings on the pipe tee in almost any desired pattern. For securing the rows of spikes in place rovings may be guided by hand as the mandrel is slowly rotated. Since a large thickness of reinforcement is built up in the structural layers of the pipe tee, it is preferable to control the mandrel rotation and delivery ring locations according to a predetermined program for quickly building up the required thickness of the structural layer in a reasonable interval. Such tee winding machines and their control are conventional.

A substantial portion of the principal structural layer 15 of the fiberglass pipe tee is wound with more or less conventional patterns of circumferential and helical windings around the ends of the run and branch, and diagonally or helically extending windings through the crotch areas and around the opposite sides of the run and branch. Typically, such windings are made by feeding both a band of rovings and a band of unidirectional tape simultaneously to the rotating tee. Approximately equal weights of short fibers in the tape and continuous fibers in the rovings are wound into the structural layer.

At least a portion of the windings of tape and rovings extend through the rows of spikes on opposite sides of the tee. The spikes are made long and slender so that as the windings are made, the spikes pierce the band of rovings and unidirectional tape, so that the windings may be pulled down tightly against the tee without leaving voids or appreciable bridging.

With the rovings and tapes passing through the row of spikes, it is possible to change direction of the windings as they pass through the spaces between the spikes, thereby assuring that the windings do not slip off of the diaphragm area and can build up the required strength in that area. Each band of rovings and tape is appreciably wider that the space between a pair of adjacent spikes, so that several spikes pierce the band and tape and direction may change in several spaces between spikes. Clearly, narrower bands of rovings and tapes may be used, but wider bands enable the placement of material more quickly and reduce winding time and cost of the tee.

Figure 8:
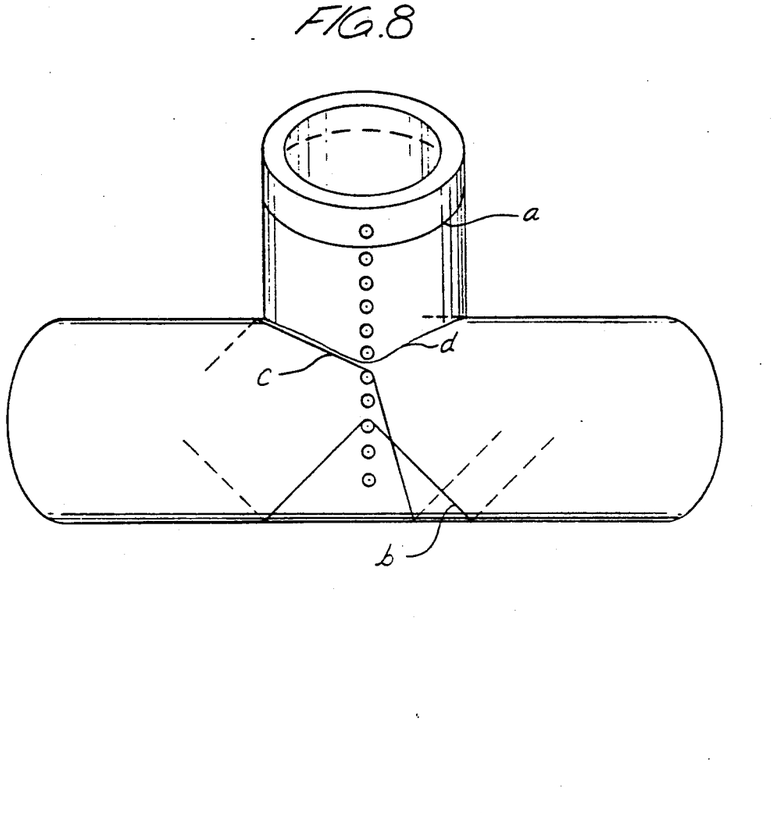
FIG. 8 is a schematic illustration of a tee with a few exemplary windings for the principal structural layer.

Winding patterns that pass through the rows of spikes include: (a) patterns that wrap around the branch, through the row of spikes and back around the branch; (b) patterns that wrap around the run, through the row of spikes and back around the run; (c) patterns that extend through a crotch, through the row of spikes and around the back of the run; and (d) patterns that extend through one crotch, through the row of spikes and through the opposite crotch. The general direction of exemplary windings are shown schematically by a single line (instead of a band) in FIG. 8.

The rovings are wound under tension in the range of from about 1.1 to 2.3 kilograms per roving. About 24 rovings at a time are in a typical five centimeter wide band. Each roving has about 1350 meters per kilogram of material.

Such patterns, plus those that extend helically and circumferentially around the ends of the run and branch (not shown), are built up in the tee winding machine until the spikes are largely buried in the built-up structural layer. At that point, one may either finish the external surface of the tee or add an additional structural layer.

One may finish the tee by winding rovings only over the external surface, as previously practiced, for assuring that the ends of the short fibers in the tape are embedded in the body of the tee and providing an acceptable external appearance. If desired, one may add fabric mats in the diaphragm area for somewhat greater thickness under the final all-rovings windings.

Figure 9:
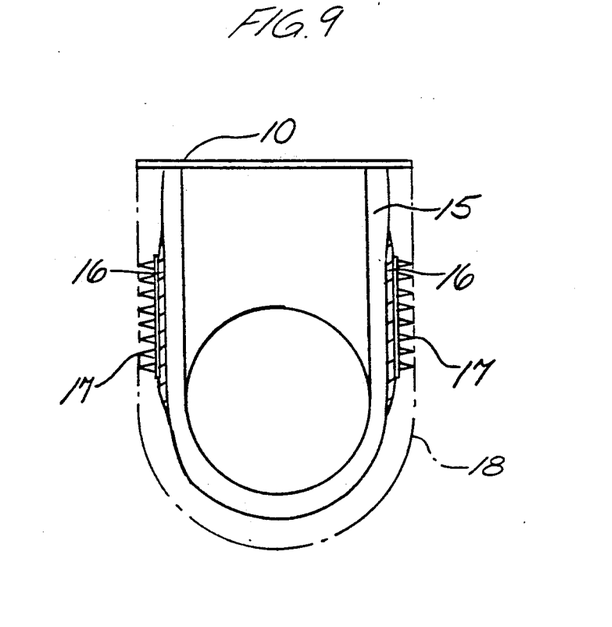
FIG. 9 is an end view of a pipe tee with spikes in place for winding a second structural layer.
Figure 10:
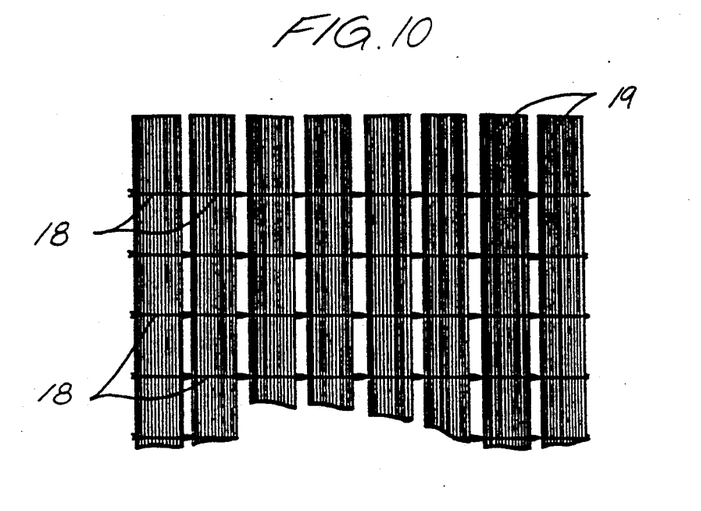
FIG. 10 is a face view of an exemplary tape used for winding a pipe tee.
Figure 11:
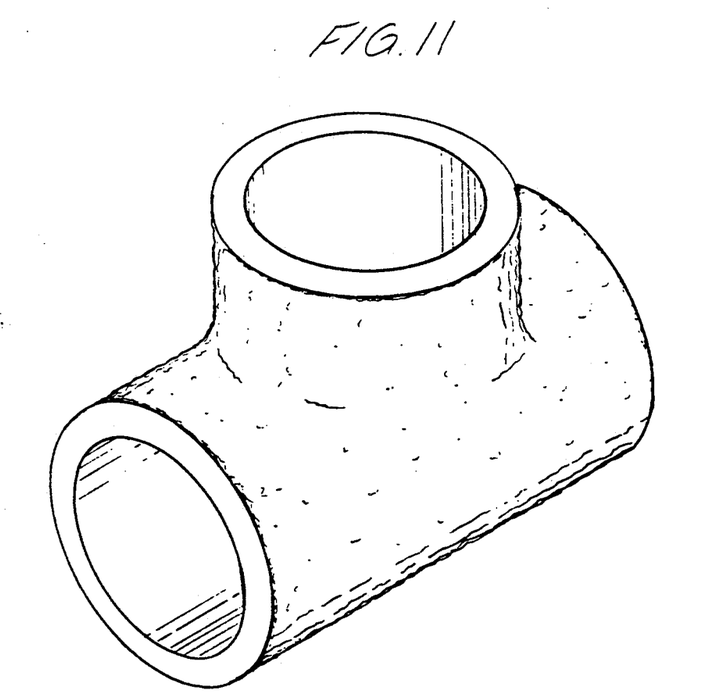
FIG. 11 illustrates isometrically a completed pipe tee constructed according to principles of this invention.

For high pressure service, one may add an additional structural layer 18. Typically, in such an embodiment, an additional patch or layer of patches 16 of woven fabric are laid into the triangle area as illustrated in FIG. 9. In a nominal 4 inch (10 cm) pipe tee, a typical patch is about 15 centimeters square. On a nominal 6 inch (15 cm) tee such patches may be about 20 centimeters wide (in the direction of the run axis) and 15 centimeters long (in the direction of the branch axis) on each side of the tee. Each such patch is in the order of six to seven millimeters thick. A second row of spikes 17 is placed over the second layer of patches as previously described. A somewhat shorter row of spikes is suitable since the exterior of the underlying structural layer 15 is considerably more bulky than the original mandrel. Thus, for example, on a 4 inch nominal pipe tee, a row of six spikes with the first spike nine or ten centimeters from the branch end flange 10 is quite suitable. On a nominal 6 inch tee, eight spikes with the first spike about thirteen centimeters from the end flange may be used. In each case, the ribbon having a row of spikes is tied down to the underlying patch by diagonal and circumferential windings of dry roving, as described above and illustrated in FIGS. 6 and 7.

When the rows of spikes have been secured in place, additional windings of interleaved tape and rovings are wrapped over the ends of the run and branch and diagonally across the diaphragm, with a portion of the windings extending through the row of spikes for changing direction within the spaces between the spikes. In this manner, a second structural layer 18 of rovings and tapes is built up until the second rows of spikes are substantially buried in the structural layer. The tee may then be finished with an outer-most layer of windings of all rovings.

When winding is completed, the resin of the pipe tee is cured in the conventional manner suitable for the particular resin chosen.

Thus, in practice of this invention, long slender spikes are embedded in the principal structural layer or layers forming the body of the tee. About ¼ of the thickness of the wall in the diaphragm area is made up of the bidirectional woven fabric patches underlying the spikes. About ¾ of the wall thickness is formed of interleaved continuous fibers and unidirectional tape of short fibers approximately orthogonal to the continuous fibers. At least a portion of the windings of the rovings and tape in the principal structural layer or layers extend through the row of spikes and change direction in the spaces between the spikes. A thin layer of only rovings is then applied over the principal structural layer for providing a suitable external surface on the pipe tee as provided in the prior practice.

This structure may be contrasted with the prior practice where short "spikes" or "bumps" were used for the outermost all-rovings winding. In such a pipe tee, about 90% of the wall thickness forming the principal structural layer was underneath the spikes, and about 10% of the wall thickness was in the form of all-roving windings, a portion of which passed through the rows of bumps.

Although limited embodiments of fiber reinforced plastic pipe tees have been described and illustrated herein, many modifications and variations will be apparent to those skilled in the art. Thus, for example, the description has mentioned winding of fiberglass bonded with an epoxy resin. Similar principles may be employed for winding other reinforcing fibers and resins. The ribbon bearing spikes in this embodiment is made of the same resin used for the lining of the pipe tee. Clearly other materials may be used, and if desired, the spikes and ribbons may include reinforcing fibers.

Many other modifications and variations will be apparent to those skilled in the art, and it is therefore to be understood that, within the scope of the appended claims, the invention may be practiced otherwise than as specifically described.

What is claimed is:

1. A fiber reinforced plastic pipe tee having a straight run and a side branch comprising:
    a principal structural layer of reinforcing fibers bonded by resin; and
    a row of spikes embedded in the structural layer along a side of the branch and extending normal to the axis of the run, each spike extending normal to the midplane of the tee, at least a portion of the reinforcing fibers extending through the spaces between the spikes and changing direction in the spaces between spikes.

2. A pipe tee as recited in claim I wherein the principal structural layer comprises alternating layers containing continuous reinforcing fibers and layers containing short fibers having ends embedded in the structural layer, the short fibers lying approximately orthogonal to the continuous fibers, at least a portion of the short fibers and the continuous fibers extending through the spaces between the spikes.

3. A pipe tee as recited in claim further comprising an outer layer of resin reinforced with continuous fibers.

4. A pipe tee as recited in claim 1 comprising an inner layer including a patch of biaxial woven fabric of reinforcing fibers bonded with resin.

5. A pipe tee as recited in claim 1 further comprising a second principal structural layer overlying the principal structural layer, the second principal structural layer comprising a second row of spikes along a side of the branch and extending normal to the axis of the run, each spike extending normal to the mid-plane of the tee, and a body of reinforcing fibers bonded by resin, at least a portion of the reinforcing fibers extending through the spaces between the second spikes and changing direction in the spaces between the second spikes.

6. A pipe tee a s recited in claim 1 wherein the spikes comprise a backing ribbon and a plurality of spikes integral with the ribbon and extending laterally from a face of the ribbon.

7. A pipe tee as recited in claim 6 wherein the ribbon and spikes are formed of a resin sufficiently flexible for the ribbon to conform to an underlying portion of the tee and sufficiently rigid to avoid substantial bending of the spikes by reinforcing fibers changing direction in spaces between the fibers.

8. A pipe tee as recited in claim 1 wherein the principal structural layer comprises a plurality of layers, a portion of the layers containing continuous reinforcing fibers and another portion of the layers containing short fibers having ends embedded in the structural layer.

9. A pipe tee as recited in claim 1 wherein the spikes each taper from a larger diameter nearer the inner surface of the tee toward a smaller diameter nearer the outer surface of the tee.

10. A pipe tee as recited in claim 1 wherein each spike has a length several times its average transverse diameter.

11. A fiber reinforced plastic pipe tee having a straight run and side branch and a generally triangular area on each side of the body of the tee adjacent to the intersection of the run and branch and approximately parallel to the mid-plane of the tee, comprising:
    a structural layer comprising a plurality of continuous fibers wound through the structural layer approximately parallel to the outside surface of the tee, and a plurality of short reinforcing fibers having ends embedded in the structural layer, the fibers being bonded together by resin; and
    means embedded in the structural layer in the generally triangular area on each side of the tee for changing the direction of at least a portion of the continuous fibers extending through the triangular areas of the tee.

12. A pipe tee as recited in claim 11 wherein the means for changing direction comprises a plurality of spikes extending through at least a portion of the structural layer in a direction normal to the surface of the structural layer.

13. A pipe tee as recited in claim 12 wherein the spikes each taper from a larger diameter nearer the inner surface of the tee toward a smaller diameter nearer the outer surface of the tee.

14. A fiber reinforced plastic pipe tee having a straight run and a side branch and a generally triangular area on each side of the body of the tee adjacent to the intersection of the run and branch and approximately parallel to the mid-plane of the tee, comprising:
    a principal structural layer including a tape comprising a plurality of warp carrier fiber and a plurality of short weft reinforcing fibers having ends embedded in the structural layer, the tape being wound through the structural layer approximately parallel to the outside surface of the tee;
    a plurality of spikes embedded in the structural layer in the generally triangular area on each side of the tee piercing the tape; and
    a plurality of continuous reinforcing fibers wound through the structural layer approximately parallel to the surface of the tee and interleaved between windings of the tape, at least a portion of the windings of continuous reinforcing fibers extending through spaces between spikes and changing direction in spaces between spikes.

15. A pipe tee as recited in claim 14 wherein at least a portion of the tape changes direction in spaces between the spikes.

16. A pipe tee as recited in claim 14 wherein the spikes are in a row extending parallel to the axis of the branch and each spike extends approximately normal to the mid-plane of the tee.

17. A fiber reinforced plastic pipe tee having a straight run and a side branch and a generally triangular area on each side of the body of the tee adjacent to the intersection of the run and branch and approximately parallel to the mid-plane of the tee, comprising:
   an inner layer rich in resin;
   a principal structural layer overlying the inner layer, the structural layer comprising alternating layers containing continuous reinforcing fibers and layers containing short fibers having ends embedded in the structural layer and all bonded together by resin, the short fibers lying approximately orthogonal to the continuous fibers, the fibers extending through the structural layer approximately parallel to the outside surface of the tee; and
   a plurality of spikes embedded in the structural layer in the generally triangular area on each side of the tee, each spike extending approximately normal to the midplane of the tee, at least portions of the continuous fibers and short fibers passing through spaces between adjacent spikes and at least a portion of the continuous fibers changing direction in spaces between adjacent spikes.

18. A pipe tee as recited in claim 17 further comprising an outer layer of continuous fibers bonded together by resin.

19. A pipe tee as recited in claim 17 wherein the inner layer includes a patch of biaxial woven fabric of reinforcing fibers bonded with resin underlying the spikes.

20. A pipe tee as recited in claim 17 further comprising a second principal structural layer overlying the principal structural layer, the second principal structural layer comprising a second row of spikes along each side of the branch and extending normal to the axis of the run, each spike extending approximately normal to the mid-plane of the tee, and a body of continuous reinforcing fibers and short reinforcing fibers having ends embedded in the second structural layer, all of the fibers being bonded by resin, at least a portion of the continuous fibers extending through the spaces between the second spikes and changing direction in the spaces between the second spikes.

21. A method for winding a fiber reinforced plastic pipe tee having a straight run an da side branch and a generally triangular area on each side of the body of the tee adjacent to the intersection of the run and branch and approximately parallel to the mid-plane of the tee comprising the steps of:
   placing a plurality of spikes extending outwardly from the mandrel in the triangular area on each side of the tee; and
   winding a tape having weft of parallel reinforcing fibers and a warp of carrier fibers for maintaining the reinforcing fibers approximately parallel to each other, around the mandrel and at least partially over the spikes so that the spikes pierce the tape and the reinforcing fibers in the tape are pulled inwardly toward the mandrel without appreciable voids under the fibers for forming a principal structural layer of the pipe tee; and
   winding a plurality of continuous reinforcing fibers around the mandrel and interleaved with the wound layers of tape, at least a portion of the continuous reinforcing fibers being wound through spaces between the spikes and changing direction in the spaces between the spikes.

22. A method as recited in claim 21 further comprising the step of forming a liner on the mandrel before placing the spikes.

23. A method as recited in claim 21 further comprising the step of placing a patch of woven fabric impregnated with resin on the mandrel covering at least the triangular areas and placing the spikes over the patches.

24. A method as recited in claim 21 further comprising the steps of:
   placing a second plurality of spikes extending outwardly from the mandrel in the triangular area on each side of the tee over the windings of tape; and
   winding a tape having a weft of parallel reinforcing fibers and a warp of carrier fibers for maintaining the reinforcing fibers approximately parallel to each other around the mandrel and at least partially over the second spikes so that the second spikes pierce the tape and the reinforcing fibers in the tape are pulled inwardly toward the mandrel without appreciable voids under the fibers.

25. A method as recited in claim 24 further comprising the step of placing a patch of woven fabric impregnated with resin on the principal structural layer covering at least the triangular areas and placing the second row of spikes over the patches.

26. A method for winding a fiber reinforced plastic pipe having a straight run and a side branch and a generally triangular area on each side of the body of the tee adjacent to the intersection of the run and branch and approximately parallel to the mid-plane of the tee comprising the steps of:
   placing a plurality of spikes extending outwardly from the mandrel in the triangular area on each side of the tee; and
   forming a principal structural layer of the tee by the steps of:
      winding a plurality of continuous reinforcing fibers around the mandrel and at least partially over the spikes so that the fibers enter spaces between adjacent spikes;
      winding a tape having a carrier warp and a weft of short reinforcing fibers around the mandrel and at least partially over the spikes so that the reinforcing fibers enter spaces between adjacent spikes, at least a portion of the tape being interleaved with continuous reinforcing fibers, the fibers being wetted with resin;
      changing the direction of the path of at least a portion of the continuous fibers in spaces between spike; and
      changing the direction of the path of at least a portion of the tape in spaces between spikes.

27. A method as recited in claim 26 further comprising:
   placing a patch of biaxial woven reinforcing fibers in at least the triangular area on each side of the tee underneath the spikes.

* * * * *